United States Patent [19]

Balasubramanian et al.

[11] 3,909,626

[45] Sept. 30, 1975

[54] CONTROL OF AXB MATRIX THERMAL PRINTHEAD

[75] Inventors: K. Balasubramanian; Joe F. Sexton, both of Houston, Tex.

[73] Assignee: Texas Instruments Incorporated, Dallas, Tex.

[22] Filed: Dec. 28, 1973

[21] Appl. No.: 429,335

[52] U.S. Cl. .............................. 235/156; 340/172.5

[51] Int. Cl.[2] ...................... G06F 7/38; G06K 15/02

[58] Field of Search .............. 235/156, 152, 151.22; 340/172.5; 444/1; 178/23 R

[56] References Cited

UNITED STATES PATENTS

| | | | |
|---|---|---|---|
| 2,909,993 | 10/1959 | Shafer et al. | 235/151.22 |
| 3,753,246 | 8/1973 | Kiffmeyer et al. | 340/172.5 |

OTHER PUBLICATIONS

Bliss et al. – "Computer Output Printing and Plotting, etc.," Conference: Electronic and Aerospace Systems; Eascon 70 Convention Record (26–28 Oct. 1970), Washington, D.C.

*Primary Examiner*—Joseph F. Ruggiero
*Attorney, Agent, or Firm*—Harold Levine; Edward J. Connors, Jr.; John G. Graham

[57] ABSTRACT

A semiconductor chip controls an A x B matrix of heaters in a thermal printhead in accordance with a digital code stored in a buffer register. A logic array gated to the register is programmed selectively to enable A control lines leading to columns of heaters. A counter sequentially enables B control lines leading to rows of heaters. Control logic is responsive to a function code to initiate a printing operation in which a counter operates in response to a condition in the control logic to immobilize the control logic and to initiate B successive burn/cool cycles each followed by incrementing the row counter. Responsive to a final condition in the row counter, the control logic is again rendered operable.

10 Claims, 16 Drawing Figures

CONTROL OF AXB MATRIX THERMAL PRINTHEAD

This invention relates to thermal printing, and more particularly to the actuation of an A x B matrix of heater elements in a printhead in accordance with controls developed on a semiconductor chip which is self-programmed to sequence the heater matrix.

Development of LSI/MOS technology has made possible the manufacture of a wide variety of versatile small size numerical calculators. Generally such calculators display data by means of light emitting electronic arrays capable of presenting alphanumeric symbols as well as other specialized symbols, plus, minus, multiply and divide and the like. The need for capturing calculator data in printed form has led to consideration of thermal printers in connection with heat sensitive paper tapes. Such printers are compatible in size with the general nature of such calculator systems and thus are attractive from the standpoint of both the portable as well as desk calculators that are implemented on one, two or three semiconductor LSI/MOS chips.

The present invention is directed to thermal printing of symbols through the use of a printhead that has heaters in an A × B dot matrix array to print on heat sensitive paper.

In accordance with one aspect of the present invention, a semiconductor printer control chip actuates an A × B matrix of heaters in accordance with a digital code stored in a buffer register. A logic array is gated to the buffer register and programmed selectively to enable A control lines leading to columns of heaters in the printhead in accordance with the code. A row counter sequentially enables B control lines leading to rows of heaters in the printhead. A control logic array is programmed to be responsive to a function code to initiate a printing operation. A digit counter is operable in response to a condition in the control logic array to immobilize the control logic array and initiates B successive burn/cool cycles each followed by incrementing the row counter. A condition in the row counter is then employed to enable further change in the control logic array at the conclusion of printing a given symbol. The printer chip includes means for internal generation of microprograms in synchronism with digit times and state times of an associated calculator.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 1:
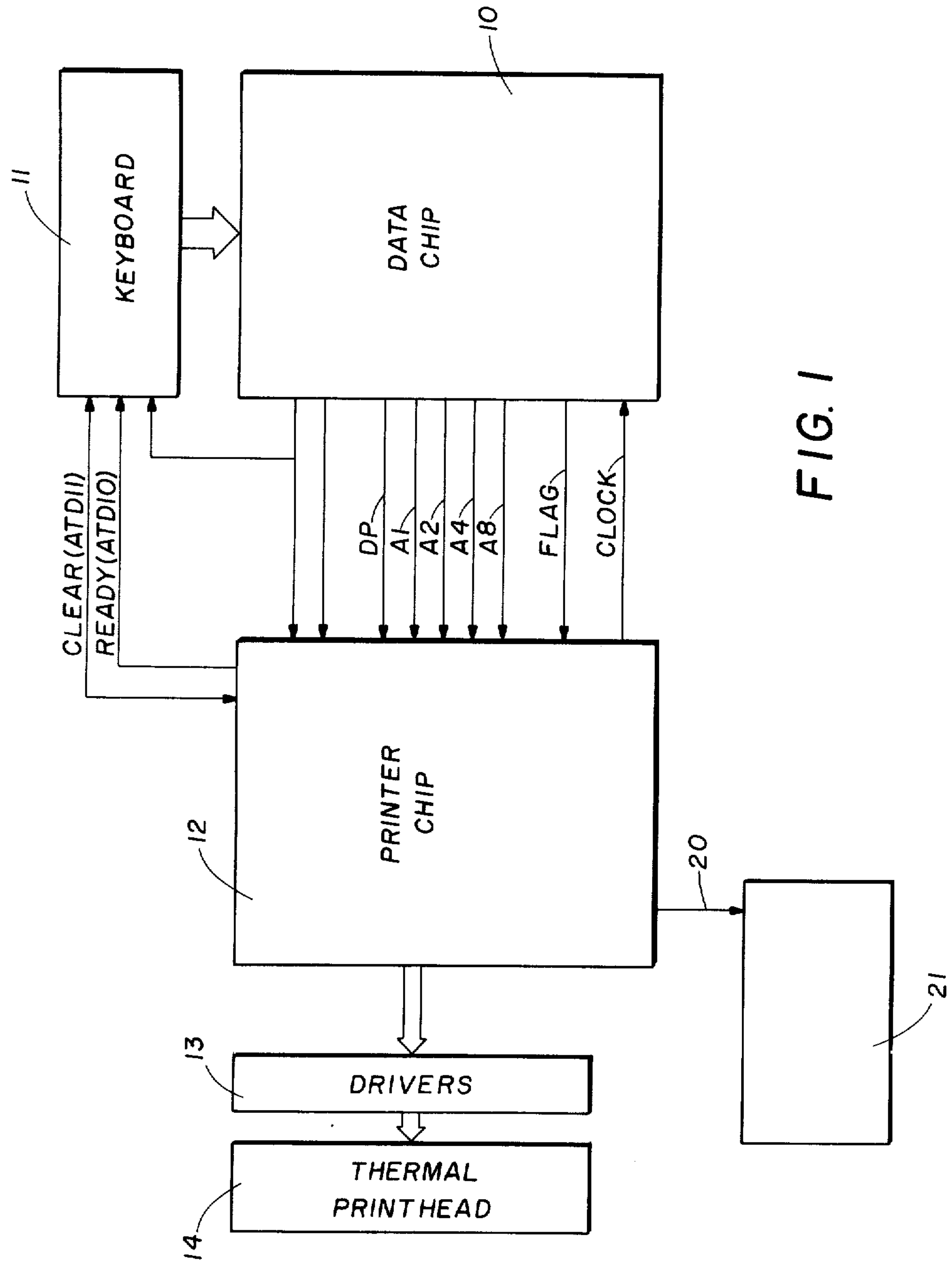
FIG. 1 is a block diagram of the present invention in which a calculator is connected to a printhead by way of a thermal print control chip.
Figure 15:
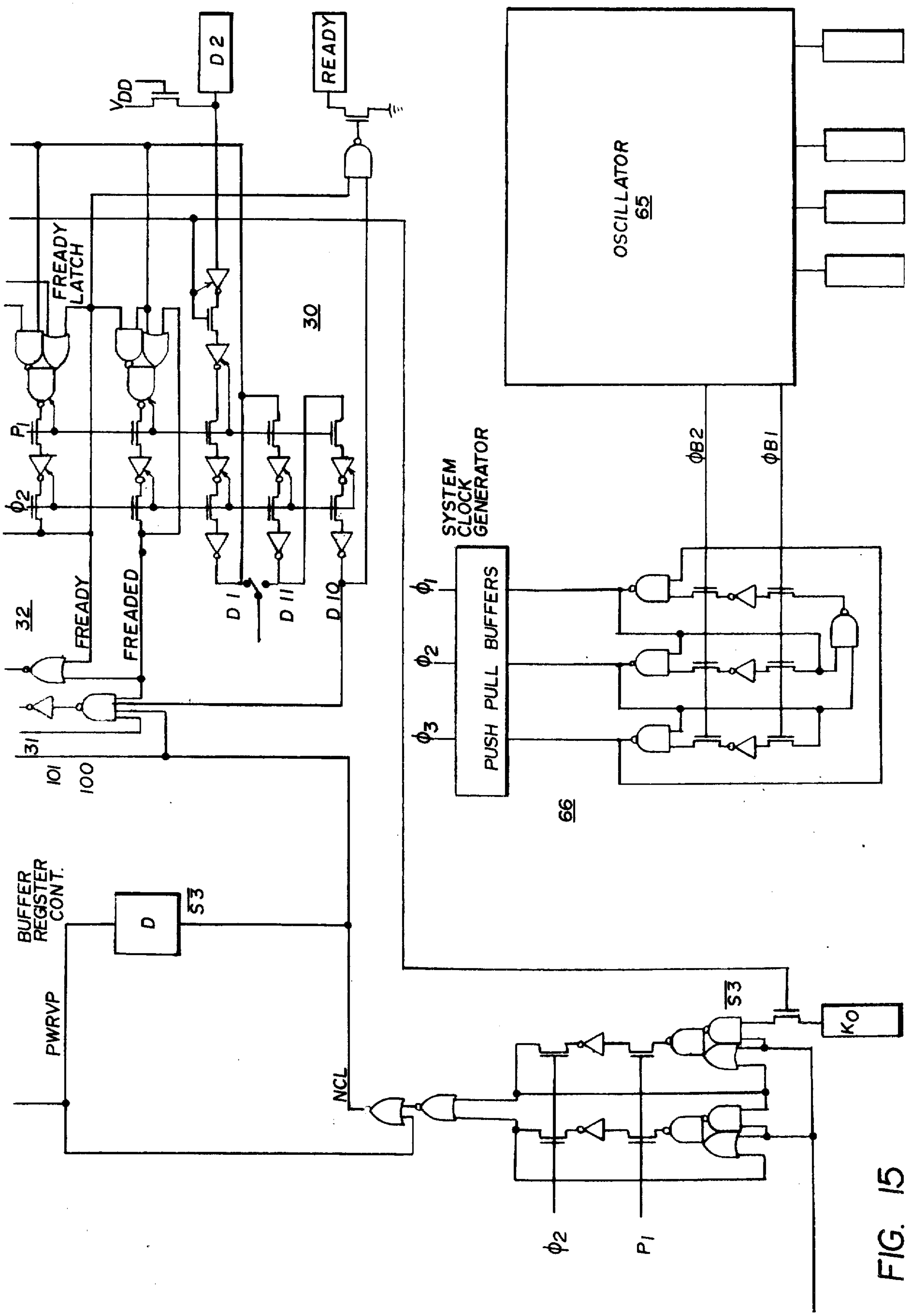
Figure 16:
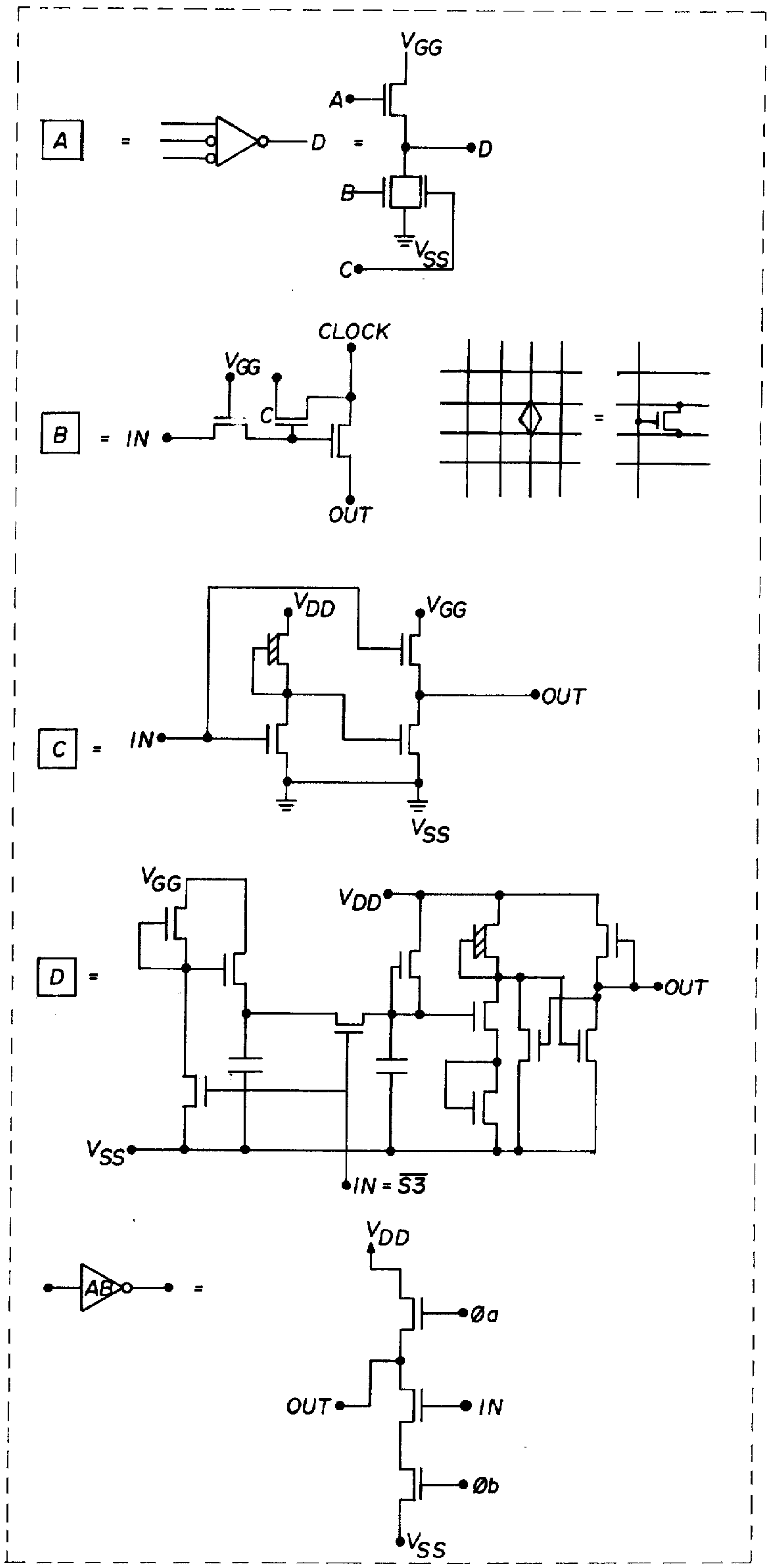

FIGS. 4–15 comprise a schematic diagram of one embodiment of the print control chip of FIG. 1;

FIG. 16 illustrates details of the circuits A–D of FIGS. 4–15.

For the purpose of the present description, a suitable printhead to be controlled may be of the type manufactured and sold by Texas Instruments Incorporated of Dallas, Texas and identified as part No. EPN2500 which is a 5 × 5 heater array. The following description will relate to an embodiment in which operations involve a 4 × 5 heater subarray in the above printhead. Further, the embodiment to be described herein is adapted to be associated with a one chip calculator manufactured and sold by Texas Instruments Incorporated of Dallas, Texas and identified as a TI Data Math Calculator which employs a Texas Instruments MOS/-LSI calculator chip part No. TMS-0100 NC which is fully described in publications of the manufacturer. Such calculator is further described and claimed in U.S. patent application Ser. No. 163,565, filed July 19, 1971 now abandoned.

In FIG. 1, as is generally known, a LSI/MOS chip 10 is responsive to numerical inputs zero through nine in a keyboard 11 and function inputs plus, minus, divide and multiply entered on function keys to perform the selected operations and to display the results. The calculator normally provides a seven segment display of the data entered.

In accordance with the present invention, the calculator provides information to a printer chip 12 each time numerical data, entered by way of keyboard 11, is followed by the entry of a function, i.e., by depressing one of the four function buttons (+, −, × and ÷). Printer chip 12 controls the operations of a thermal printhead 14 by way of a driver unit 13.

Chip 10 operates on the basis of 13 state times per D time and eleven D times per instruction cycle. One state time is defined by timing pulse $\phi_1$ which occur at a 250 KHz rate and thus one state time is of 4.0 microseconds duration. Chip 10 is connected to apply the D2 timing pulse to printer chip 12 by way of line 10a. Printer chip 12 then generates additional D times (D1, D11 and D10) for internal timing purposes. State pulses (S8) are applied from chip 10 to chip 12 by line 10*b* to synchronize the state times generated in chip 12 with the state times in chip 10.

Chip 10 generates 11 flags. Only six such flags are supplied the printer chip 12 by way of the flag line 10*h* and are sampled only during D10 times.

Chip 10 applies to chip 12 four bit binary coded data by way of lines 10*c*, 10*d*, 10*e* and 10*f* to represent characters to be printed. A decimal point signal is applied from chip 10 to chip 12 on line 10*g*. A clock signal is applied from chip 12 to chip 10 on line 12*a*. A ready signal is applied to keyboard 11 by way of line 12*b*. A clear key (c) input from keyboard 11 is applied to clear the printer chip 12 by way of line 11*a*.

Line 20 connects chip 12 to a motor 21 which is employed to move a printhead along the line to be printed.

The A × B matrix of heaters to be selectively energized print the alphanumeric characters on a dot matrix format which is implemented here as a four column, five row matrix. The motor 21 serves to step the printhead after printing of each character or symbol has been completed.

Motor 21 typically may be a four phase motor of the type manufactured and sold by North American Philips Control Corporation of Chesire, Conn. and identified as part No. B82203-M4.

Figure 2:
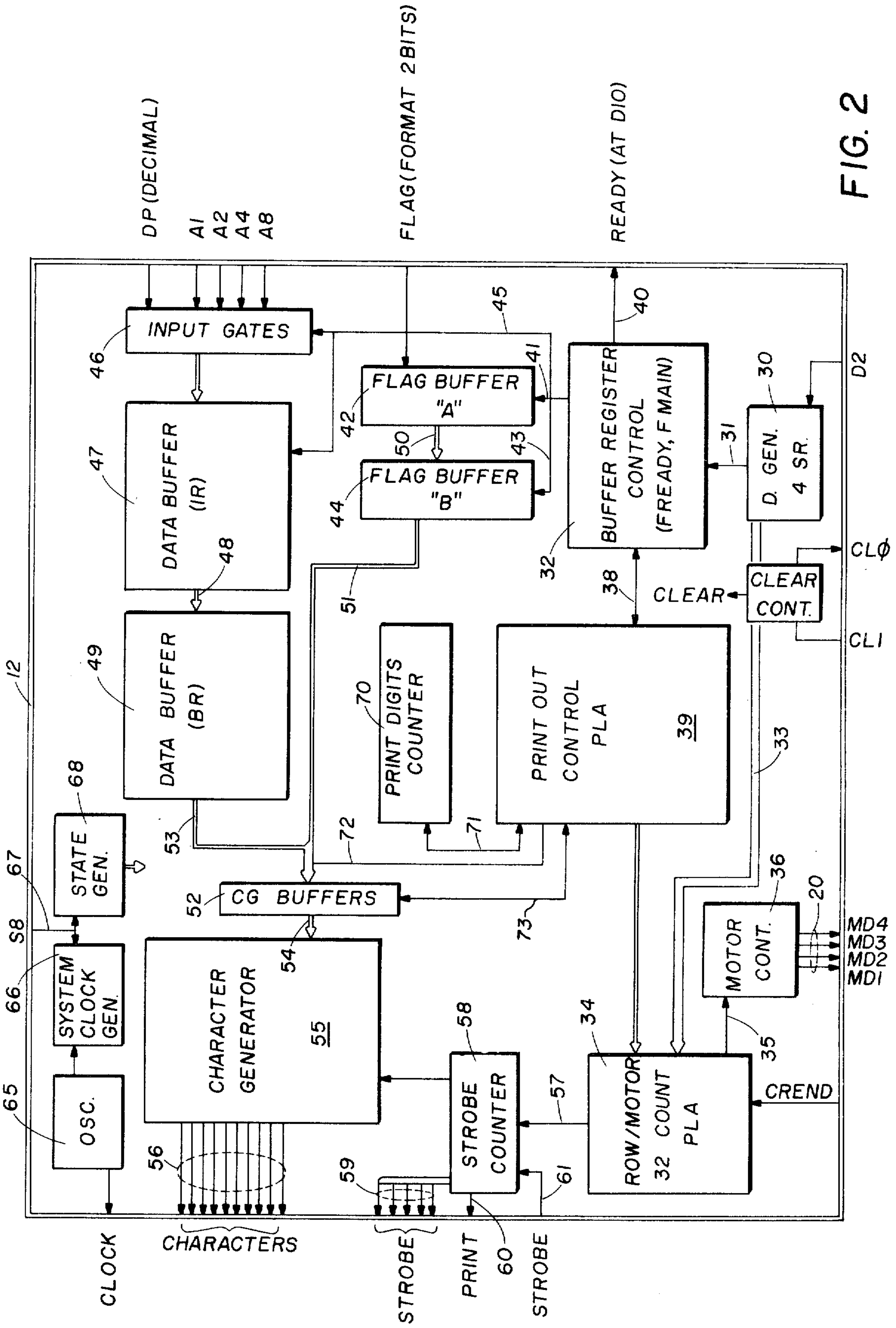
FIG. 2 is a block diagram of the essential elements of one embodiment of the print control chip of FIG. 1.

FIG. 2 is a block diagram of the printer chip 12. The input lines leading to the chip from the calculator are as follows: D2 line 10*a* leads to a digit generator 30. The output of the generator 30 is connected by way of line 31 to a buffer register control unit 32. Generator 30 is also connected by way of bus 33 to a row/motor control unit 34. Unit 34 is connected by way of channel 35 to a motor control unit 36, which is connected by way of bus 20 to motor 21.

Buffer register unit 32 is connected by way of line 38 to a printout control PLA 39. Register 32 is also connected by way of line 12*b* to the associated calculator to indicate the intervals that the chip 12 is busy. Register 32 is also connected by way of line 41 to a flag buffer unit 42, by way of line 43 to a flag buffer unit 44, and by way of line 45 to a set of input gates 46 and to a first input data register 47. Data input lines 10*c*–10*f* are connected through the input gates 46 to data register 47. The decimal point line 10*g* is also connected through gates 46 to register 47.

Flag buffer unit 42 is connected by way of bus 50 through buffer unit 44 and thence by way of bus 51 to a character generator buffer 52. Data register 47 is connected by way of bus 48 to a second data shift register 49 the output of which is connected by way of bus 53 to an output buffer register 52.

A bus 54 connects from the buffer 52 to a programmed logic array PLA which preferably is in the form of a virtual ground ROM. In the example here illustrated, the ROM 55 is a 25 character, 25 dot matrix ROM. Output lines 56 extend from ROM 55 to selected columns of heaters in the associated printhead. In the example that will be described, only four of the ten lines 56 will be employed to enable selected heaters under program control.

Row/motor control unit 34 is connected by way of line 57 to a row counter 58 which has output lines 59 leading to selected rows of the matrix of heaters in the printhead.

In order to permit selective control of heater current in the printhead, an output signal is provided from the row counter 58 on line 60. Line 60 is on when the printhead is to produce a burn on paper adjacent thereto.

A strobe line 61 leads to row counter 58 and permits selectivity as to whether or not the rows of heaters are enabled one row at a time or whether multiple rows of heaters are to be enabled at any given time. In the present example, the rows will be enabled in sequence, one row at a time.

An oscillator 65 is provided on chip 14 to energize a system clock generator 66. Line 10*b* applies state S8 from the calculator to the system clock 66 and to a printer chip state generator 68.

A print digit counter 70 is connected by way of channel 71 to printout control PLA 39 which in turn is connected by lines 72 and 73 to buffer 52.

In operation, entry of numeric data into the associated calculator followed by actuation of a function key on the calculator keyboard initiates a printing cycle implemented through the printer chip 12. Four bit BCD data representing the numerical input of the calculator is applied through gate 46 to buffer 47 and is transferred from buffer 47 to buffer 49. The BCD data may comprise up to thirteen characters or symbols. In the buffer 49, the thirteen characters or symbols are then circulated, one step each state time.

Counter 70 controls by way of PLA 39 and line 72 the particular digit in the set being circulated in register 49 to be applied to the character generator PLA 55. Once a character to be printed has been selected, the printing operation is carried out under the control of the row/motor control unit 34 in conjunction with PLA

39. The output of unit 34 enables rows of heaters to be enabled selectively in accordance with the coded outputs on bus 59. Bus 56 enables columns for a substantial burn period followed by a cooling period. Typically, the burn period would be of the order of 5, 10, or 15 milliseconds, depending upon the nature of the heaters in the printhead and the associated paper. During such burn period and for the total period required to print a given character, the character is read out from the data buffer 29 once each D time so that the PLA 55 is refreshed each D time.

Having described the operation in a general sense, the various elements of the system and their function will now be described by reference to FIGS. 4–16.

TIMING — FIG. 3

As above indicated, the basis for timing of the calculator and the printer chip in the present invention is a clock of nominal frequency of 250 KHz. A state time is equivalent to three clock pulses. A digit time (D-time) is equivalent to thirteen state times or thirty-nine clock cycles or 150 microseconds. A digit time corresponds to the amount of time during which each digit is displayed on the calculator unit. An instruction cycle occupies eleven D times.

Figures 3, 4:
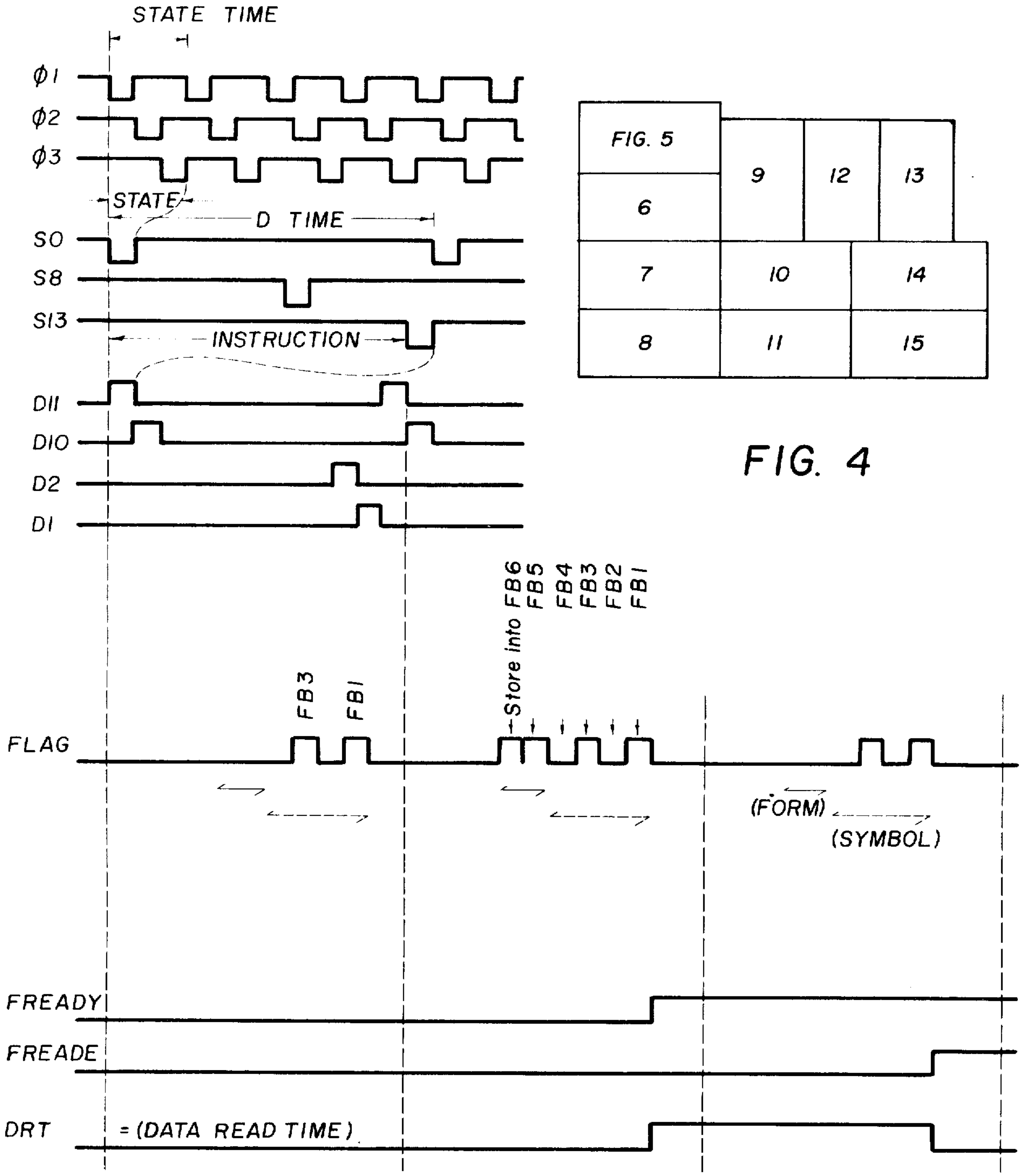
FIG. 3 is a timing diagram involved in the operation of the invention.

FIG. 3 illustrates the basic clock $\phi_1$. Companion clocks $\phi_2$ and $\phi_3$ are each successively delayed one clock cycle. $\phi_1$, $\phi_2$ and $\phi_3$ together occupy one state time.

D GENERATOR 30

The D generator 30 of FIG. 15 has input line 10a leading from the associated calculator. D generator 30 comprises a three stage shift register clocked by a P1 gate and a $\phi_2$ gate to produce outputs D1, D11 and D10 in sequence following each D2 pulse. It should be remembered that the associated calculator operates on the basis of eleven D times per instruction cycle.

Only state times S0, S8 and S13 have been illustrated in FIG. 3. Similarly, D times D11, D10, D2 and D1 have been illustrated.

FIG. 3 further illustrates the relationship between flag generation and the D times. In the first instruction cycle, flags B1 and B3 appear. In the second instruction cycle, flags FB1, FB3, FB5 and FB6 appear. Generation of flags selectively by the chip 10 in response to keyboard inputs duly programmed is utilized in the printer chip for the control of the printer chip operation. Table I indicates a one coding for entry of data into register 42 of FIG. 14 of selected symbols and space instructions.

TABLE I

| Flags on D Time D5 | D4 | D3 | D2 | Symbol |
|---|---|---|---|---|
| 1 | 0 | 0 | 0 | |
| 1 | 0 | 0 | 1 | E |
| 1 | 0 | 1 | 0 | + |
| 1 | 0 | 1 | 1 | − |
| 1 | 0 | 0 | 0 | × |
| 1 | 0 | 0 | 1 | ÷ |
| 1 | 1 | 1 | 0 | = |
| 1 | 1 | 1 | 1 | c |
| 0 | 0 | 0 | 0 | space |
| 0 | 0 | 0 | 1 | space |
| 0 | 0 | 1 | 0 | . |
| 0 | 0 | 1 | 1 | space |
| 0 | 1 | 0 | 0 | space |
| 0 | 1 | 0 | 1 | space |
| 0 | 1 | 1 | 0 | space |

TABLE I-Continued

| Flags on D Time | | | | |
|---|---|---|---|---|
| D5 | D4 | D3 | D2 | Symbol |
| 0 | 1 | 1 | 1 | space |
| (FB4) | (FB3) | (FB2) | (FB1) | |

Table II indicates a set of codes for utilization of the flag bits 6 and 5.

TABLE II

| Flag On | | |
|---|---|---|
| D7 | D6 | Format |
| 0 | 0 | Don't Move |
| 0 | 1 | Print LSD |
| 1 | 0 | Print Symbol; If FB4=1, no space If FB4=0, one space |
| 1 | 1 | Print All |
| (FB6) | (FB5) | |

FIG. 3 also illustrates the time relationships of three additional signals FREADY (Ready to accept new data from the data chip), FREADED (has received data from the data chip and is ready to shift data to second buffer) and DRT (data read time).

As will hereinafter be shown, when a flag equals zero at D6 or D7, the printer chip will start to read data. The flags on D5-D2 times are coordinates of desired symbols.

When a flag on times D7 or D6 equals zero, the chip does not read data and is waiting when the flag changes to a one. The chip reads sign or space coordinates on flag A1–A4 at state time S2. If the DP line comes one, then DP coordinates are read at state S4. The unit reads the least significant digit data at state S13.

A DA output terminal leads from generator 30 and is connectable by a selector switch to select either the D1 or the D11 output to be used as a control in the row/motor unit 34. The D10 output is connected by way of a NAND gate 100 and an inverter 101 of FIG. 15 to produce a signal which is labeled FMAIN. If FMAIN is in the one state, then gating units 102 of FIG. 12 cause data in register 47 to be transferred to register 49. If FMAIN is in the zero state, then the data in register 49 is circulated.

LATCH 32

Line 31 connects the output of inverter 101 to an input of latch 32, FIG. 15. Latch 32 includes input logic, the output of which is gated by the P1 gate and $\phi_2$ gate that also control the D generator 30. The input logic of the latch 32 is supplied from the output of the flag input register 42, FIG. 14. More particularly, the flag input register 42 is supplied by way of logic 103. Any A5 and A6 flag occurring during the D10 is applied by way of gate 104 to the input logic of latch 31. Flags A5 and A6 provide two data bits which can be programmed during digit time D10 to provide data on line 31 leading to the logic unit 102 and on the FREADY line leading to the input logic 103 of the buffer register 44. It will be noted that the register 42 is clocked by the clock pulse $\phi_2$ and by a signal SPFA, which essentially is a $\phi_1$ gated clock dependent upon FREADY and S2.

It will be recalled that only flags A1–A6 are utilized herein. The flags are entered during state 10. The flags may thus be coded for storage in buffer register 44, FIG. 14, of a code for a symbol to be printed. In such case the symbol code will be applied by way of bus 51 to the gates in buffer 52, FIG. 9, thereby to cause a function symbol to be printed.

Further, the flags A1–A6 may be encoded to signify an operation that is to be performed. In that case, the output of buffer register 44 will be applied by way of the bus **51*a* to the printout control unit 39, FIG. 11**, as an input command.

SHIFT REGISTERS 47 and 49

Figure 12:
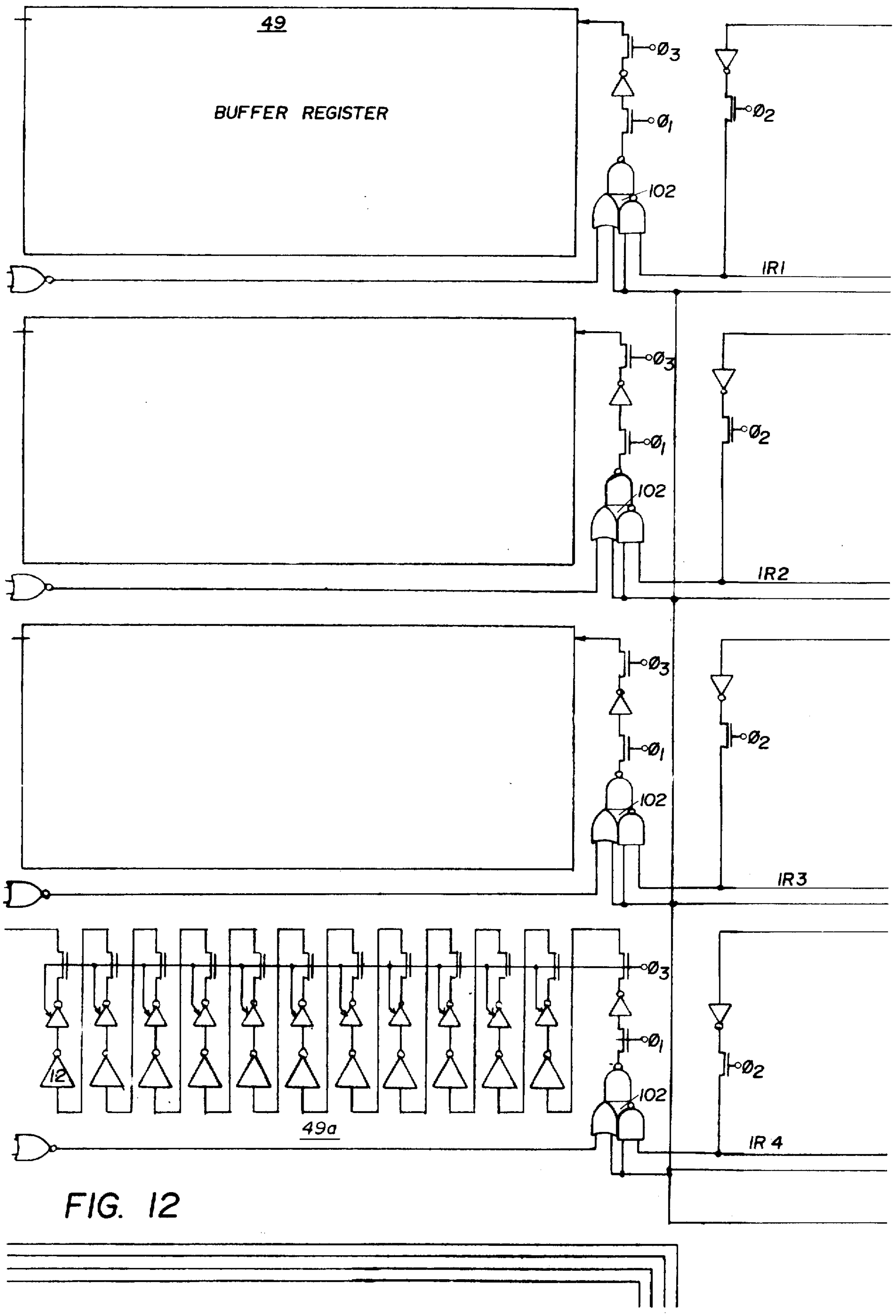
Figure 13:
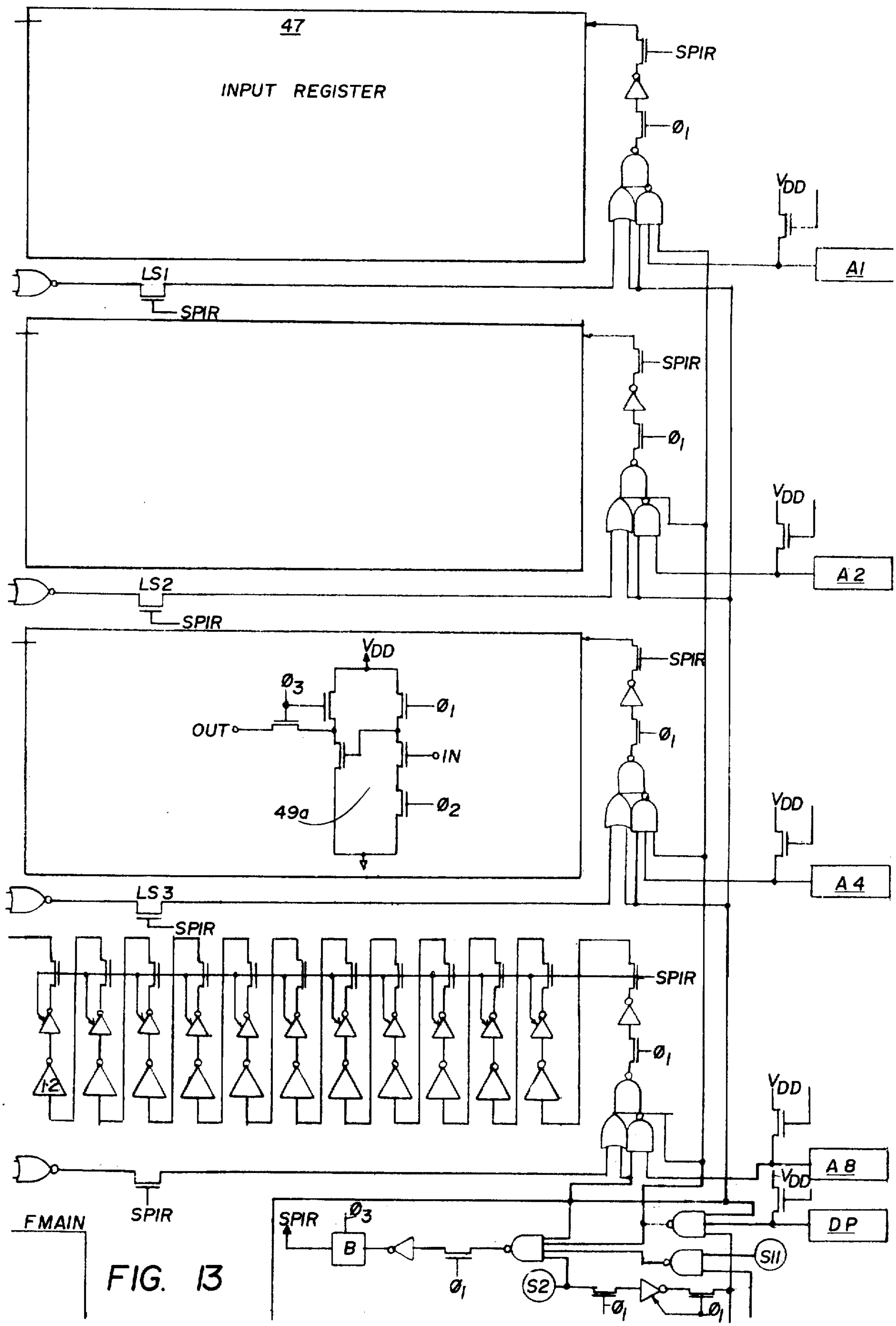
Figure 14:
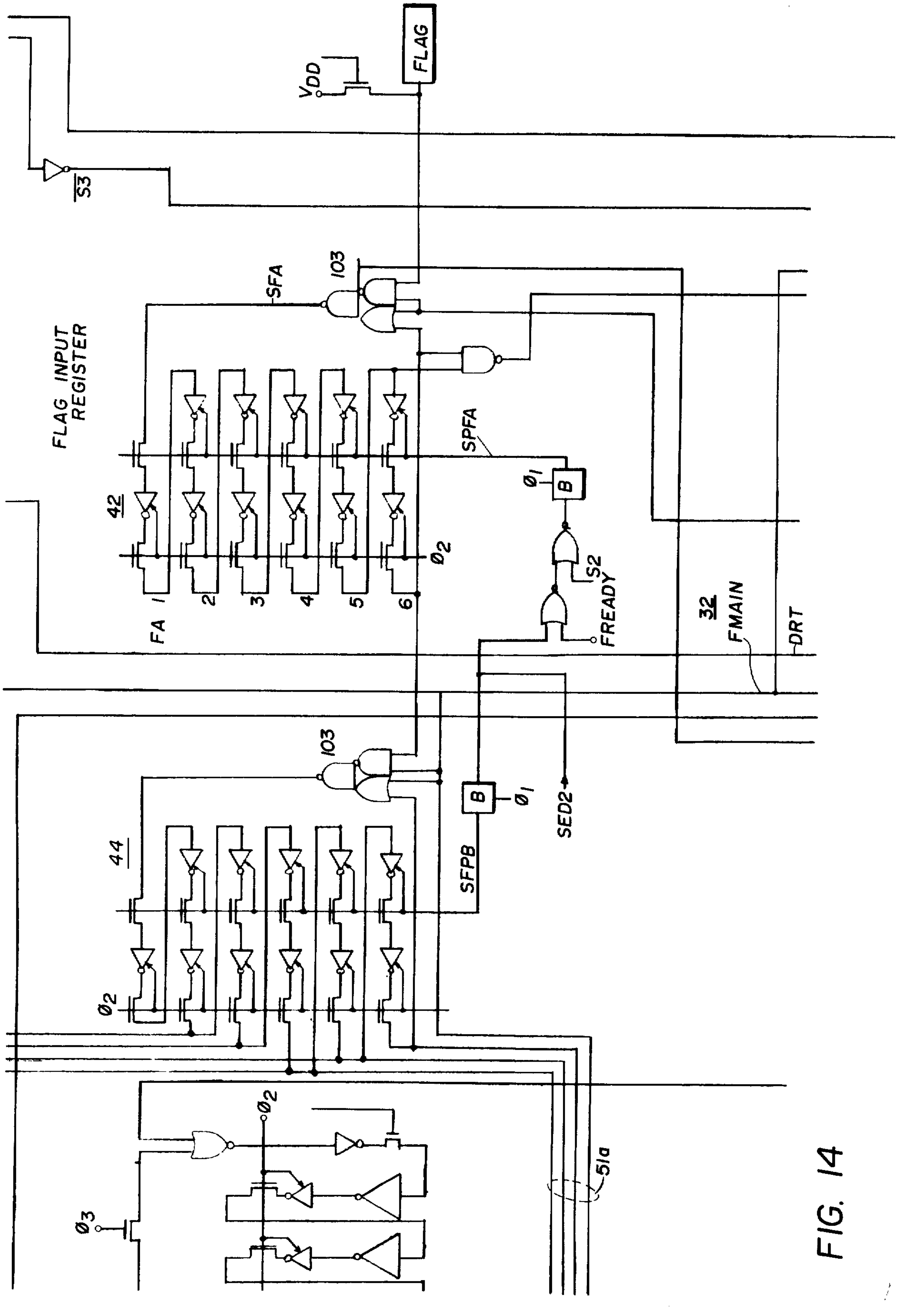

Shift registers 47 and 49, FIGS. 12 and 13, are each 4 × 13 bit shift registers. The bottom sets in both registers 47 and 49 are shown in detail. They are illustrated in logical form. Details of the circuit for the handling of each single bit in each of the registers is represented by the circuit **49*a*. Circuit 49*a*** is a three phase shift register having an input, an output and three clock voltages $\phi_1$, $\phi_2$ and $\phi_3$ connected thereto in MOS/FET form.

Data enters the system from lines **10*c*–10*f* by way of register 47. The contents of register 47 may be transferred to register 49, they may be circulated in register 47, or the contents of register 47** may be cleared, placing zeros in all set locations.

STATE GENERATOR 68

Figure 9:
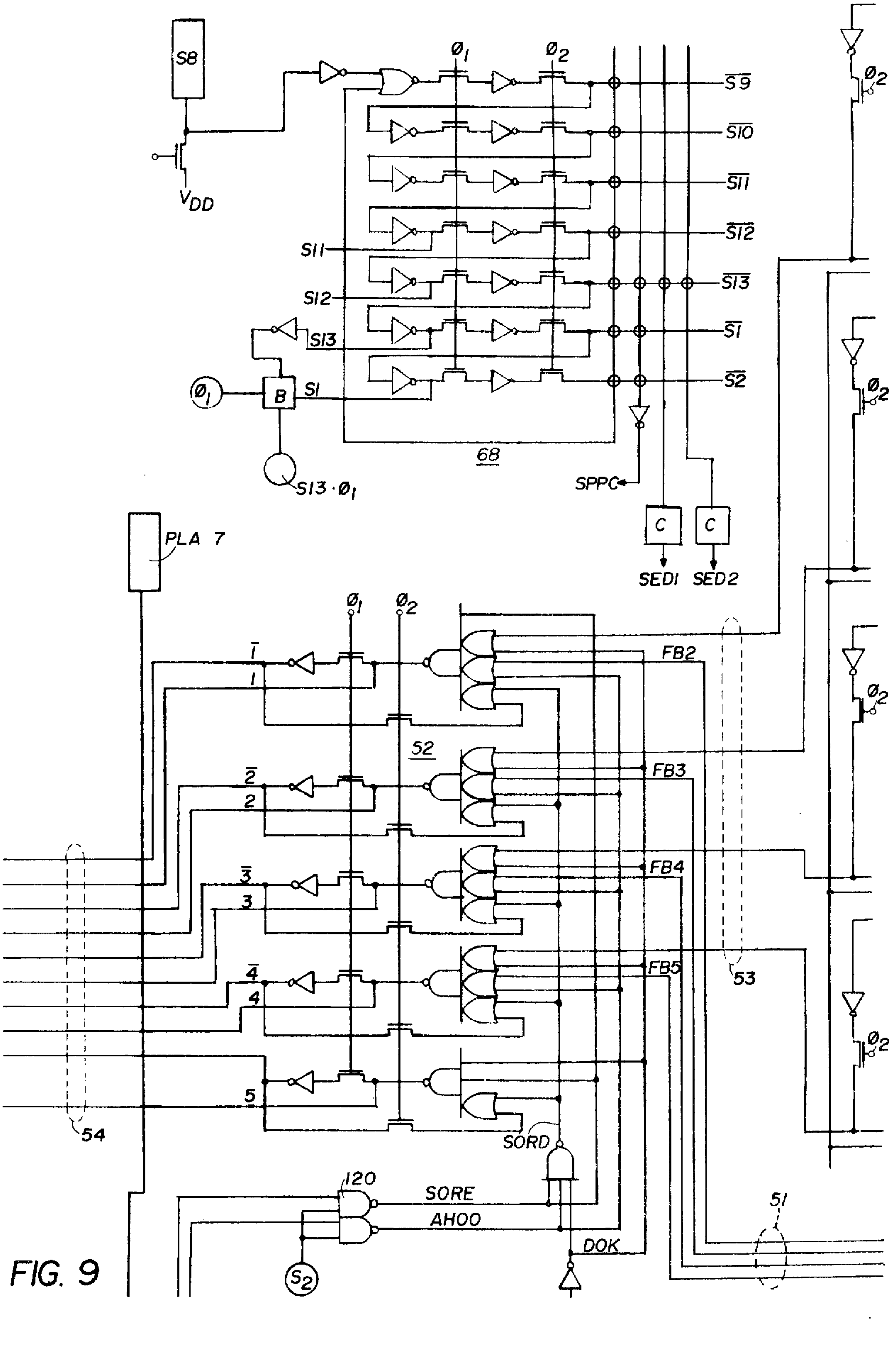

State generator 68, FIG. 9, includes a seven stage shift register having an output PLA. Generator 68 generates only seven states S9, S10, S11, S12, S13, S1 and S2. The state time rate is controlled by the clocks $\phi_1$ and $\phi_2$. The outputs of state generator 68 are used at various points so identified throughout the system.

PRINTOUT CONTROL 39

Figure 10:
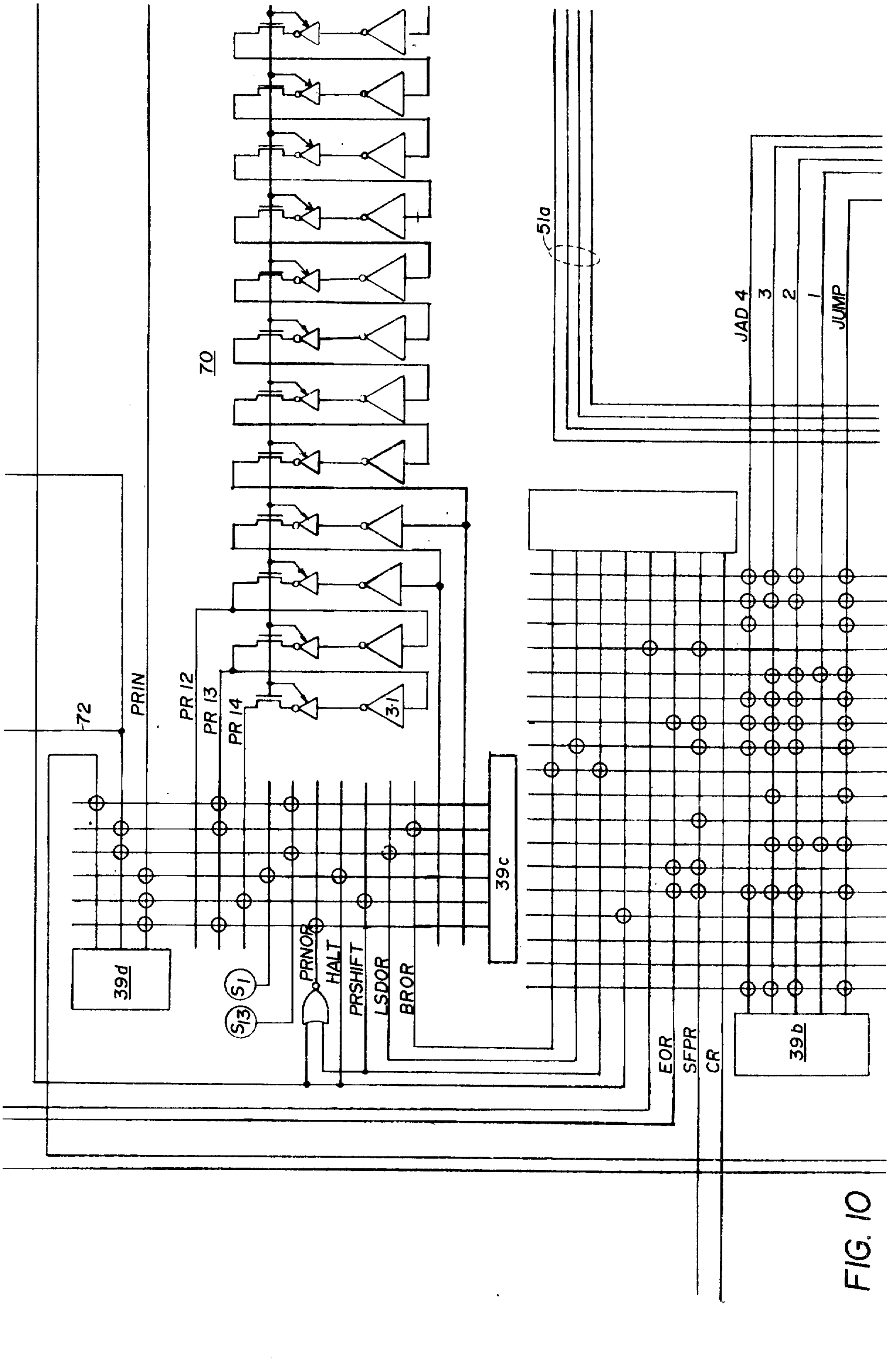
Figure 11:
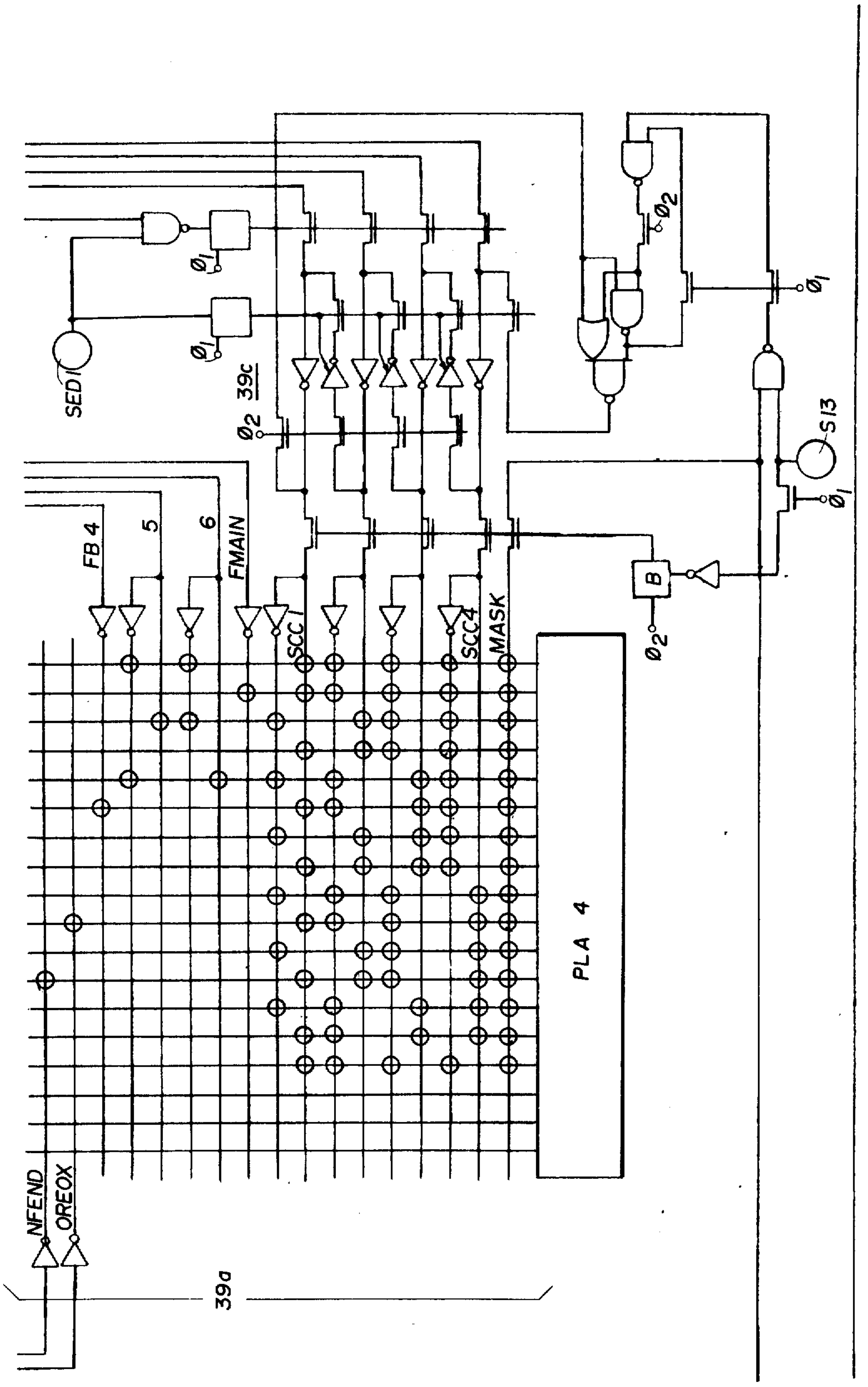

Four bit instructions are applied to the PLA 39, FIGS. 10 and 11, by way of bus **51*a*. PLA 39 has seventeen input lines and 18 select lines in input section 39*a*, five select lines in output section 39*b* and eight output lines in output section 39*c*. PLA 39 provides microprogramming for the control of operations of the system in response to the instructions applied by way of bus 51*a*. Output lines JUMP, JAD1, JAD2, JAD3 and JAD4 are connected from select lines of section 39*b* back through a counter logic unit 39*e*** in response to jump instructions.

The select lines from section **39*c* provide primary outputs from PLA 39**. There are eight such output lines BROR, LSDOR, TRSHIFT, HALT, FBOR, EOR, SFTR and CR.

The first four output lines lead to a PLA section **39*c* having 10 input lines and six select lines leading to a section 39*d* which has three select lines. Lines BROR, LSDOR, TRSHIFT and HALT serve as input lines to section 39*c* to provide control for the pointer register 70. Two output lines from section 39*c* lead to the third and fourth stages of the register 70. Input lines to section 39*d* lead from the first, second and third stages of register 70. Section 39*d* has three select lines decoding the six input lines thereto and thus provides outputs SFEND, SBROR and PRIN. The output PRIN is gated by a $\phi_3$ gate to the first stage of the pointer register 70. The pointer register 70 includes push pull noninverting units each bearing the legend "3,1**" which signifies that the device is charged on $\phi_3$ and is discharged on $\phi_1$.

If line BROR is high, then through pointer register 70 it produces an output on one of the lines PR12, PR13 or PR14 which will cause to be generated the control signal SBROR which is applied by way of line 72 to the gates in the buffer register 52, FIG. 9, to transfer to the buffer register 52 the bits on the output stage of the register 49 at the instant line 72 is enabled.

Output line LSDOR may be programmed so that the least significant digit will be printed out twice in certain instances not significant here.

Output line PRSHIFT causes the pointer register 70, FIG. 10, to shift either right or left, depending on whether the most significant digit or the least significant digit is to be printed first from the buffer 49.

Output line HALT is connected to the PLA at the input of the pointer register 70 and also is applied by way of gate 100 to make certain that data cannot be transferred from register 47 to register 49 until all the data in register 49 has been printed. HALT is also applied to the PLA section c in a logical NOR relation with PRSHIFT to cause the output from buffer 49 to be printed in the normal sequence, i.e., from least significant bit to most significant bit.

Output SFEND from register 70 indicates when the register 49 has been cycled through one complete set of digits.

PRIN through the $\phi_3$ gate circulates normally the output of PR13 back through the register input so that pointer register 70 simply cycles continuously.

Output FBOR is clocked through logic 120, FIG. 9, by state S2 to produce a signal AH00 which serves to clock into the buffer register 52 any function code stored in register 44.

Output EOOR, clocked through logic 120 to become SORE, causes the buffer 52 to operate in a latch mode. In the latch mode, any function code entered into buffer register 52 is held in the output of the register 52 for repeated input via lines 54 of FIG. 9 into the character generator 55, of FIGS. 5 and 6, during the time that the function symbol is to be printed.

CHARACTER GENERATOR 55

Figure 5:
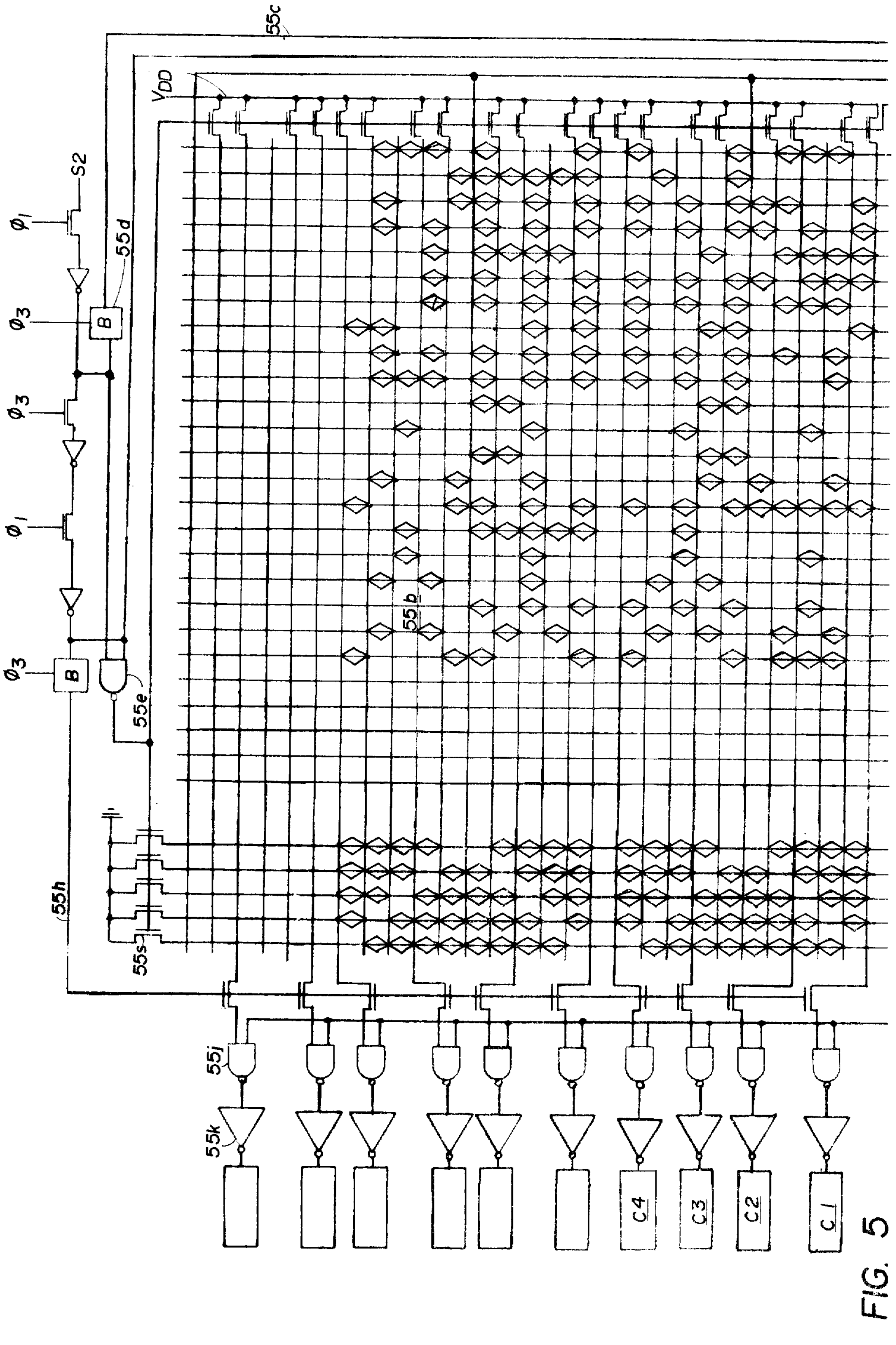
Figure 6:
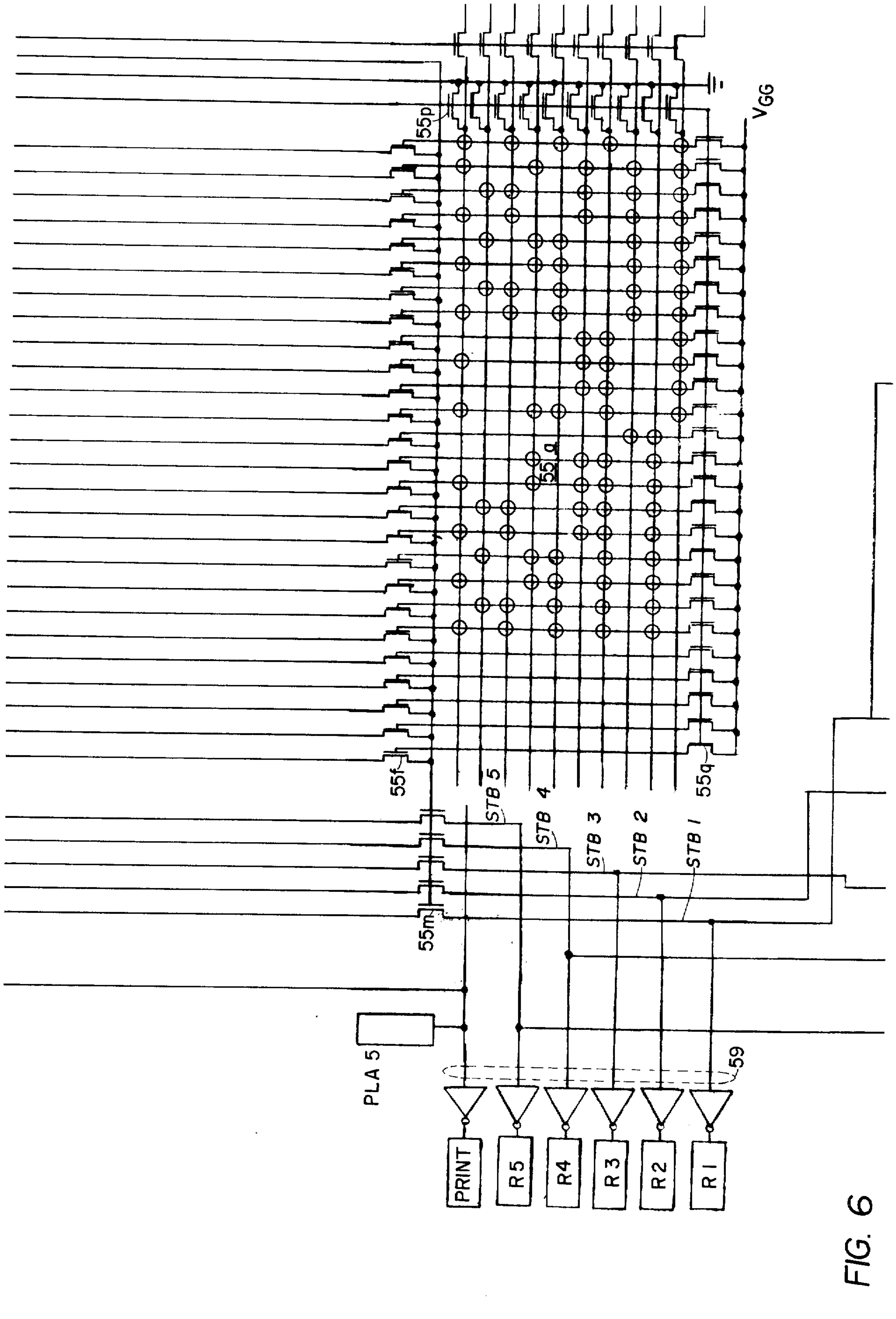

Character generator 55 of FIGS. 5 and 6 has eight input lines leading to a lower PLA section 55*a*. Input lines 54 apply five output bits from register 52 and their complements to drive the PLA input lines of section 55*a* under control of a clock on line 55*c*. Line 55*c* is controlled by a clock pulse $S_3\phi_3$ derived from an element 55*d* having as an input $S_2\phi_1$ and $\phi_3$.

The input lines to section 55*a* are gated to ground to discharge the same by way of a set of gates 55*p* that are enabled by a state on line 55*g*. At the same time, a set of gates of 55*q* connect the select lines of section 55*a* to the voltage source $V_{GG}$. Also at the same time, a set of gates 55*r* connect certain of the select lines in the upper section 55*b* to $V_{DD}$. Also a gate 55*s* connects a set of five input lines to ground. The state on line 55*g* appears at the output of NAND gate 55*e* which is generated from $S_2\phi_1$ and $\phi_3$.

A set of gates 55*f* are selectively enabled from line $V_{GG}$ when gates 55*q* conduct. Select lines in the upper section 55*b* are then connected by way of output gates 55*j* and output drivers 55*k* to enable the heater lines. In the present embodiment, only the outputs $C_1$–$C_4$ are employed.

When gate 55*e* is enabled, the output section of gate 55*b* is precharged and the input section of 55*a* is charged.

An output of the inverter energizes gates 55*f* so that one of the input lines in the section 55*b* will be energized at any given time depending upon the coding along the lines in section 55*a*. Gate 55*m* applies to the upper section 55*b* information pertaining to the rows to be enabled for printing in the print matrix.

ROW/MOTOR UNIT 34

Figure 7:
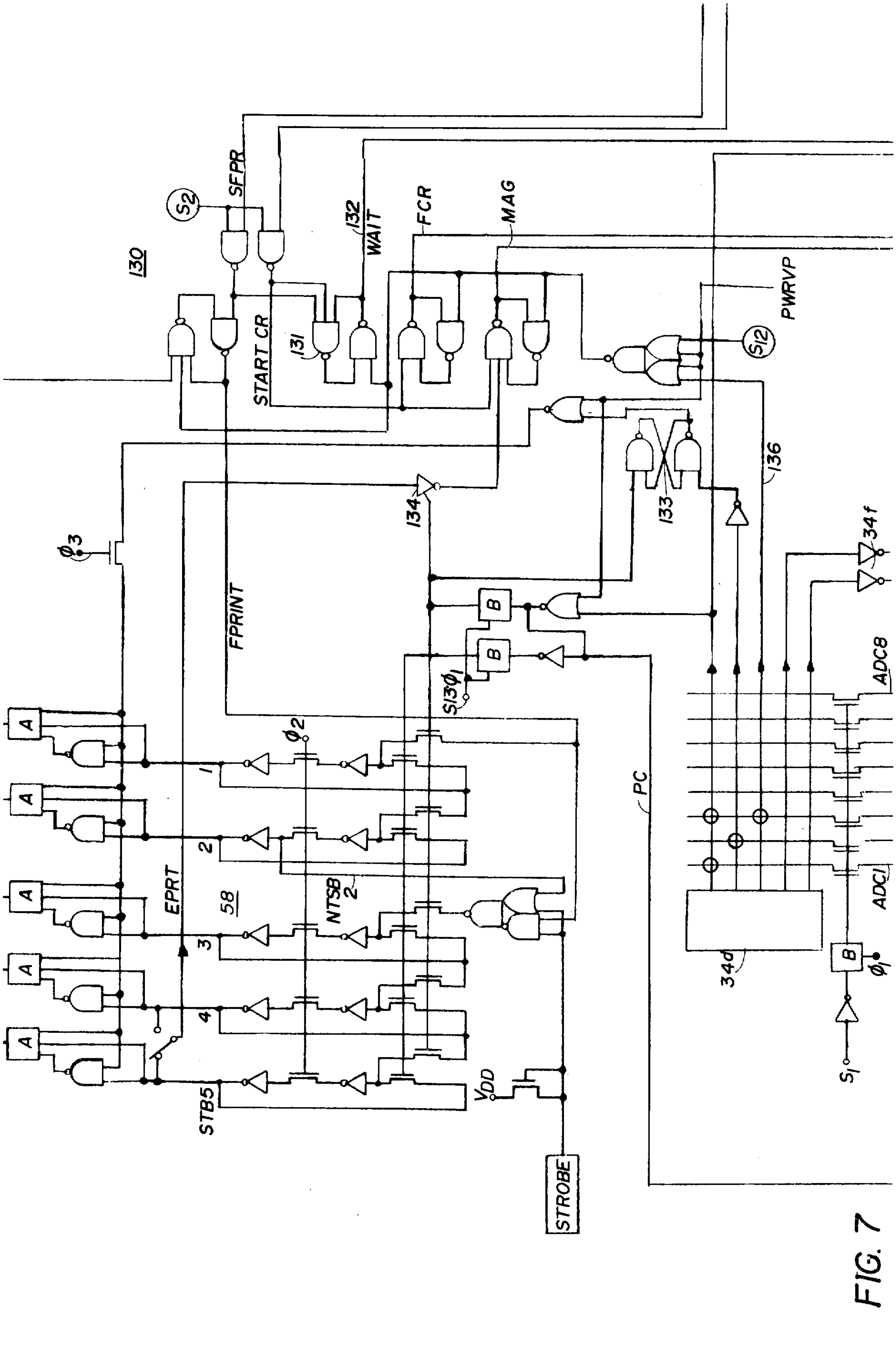
Figure 8:
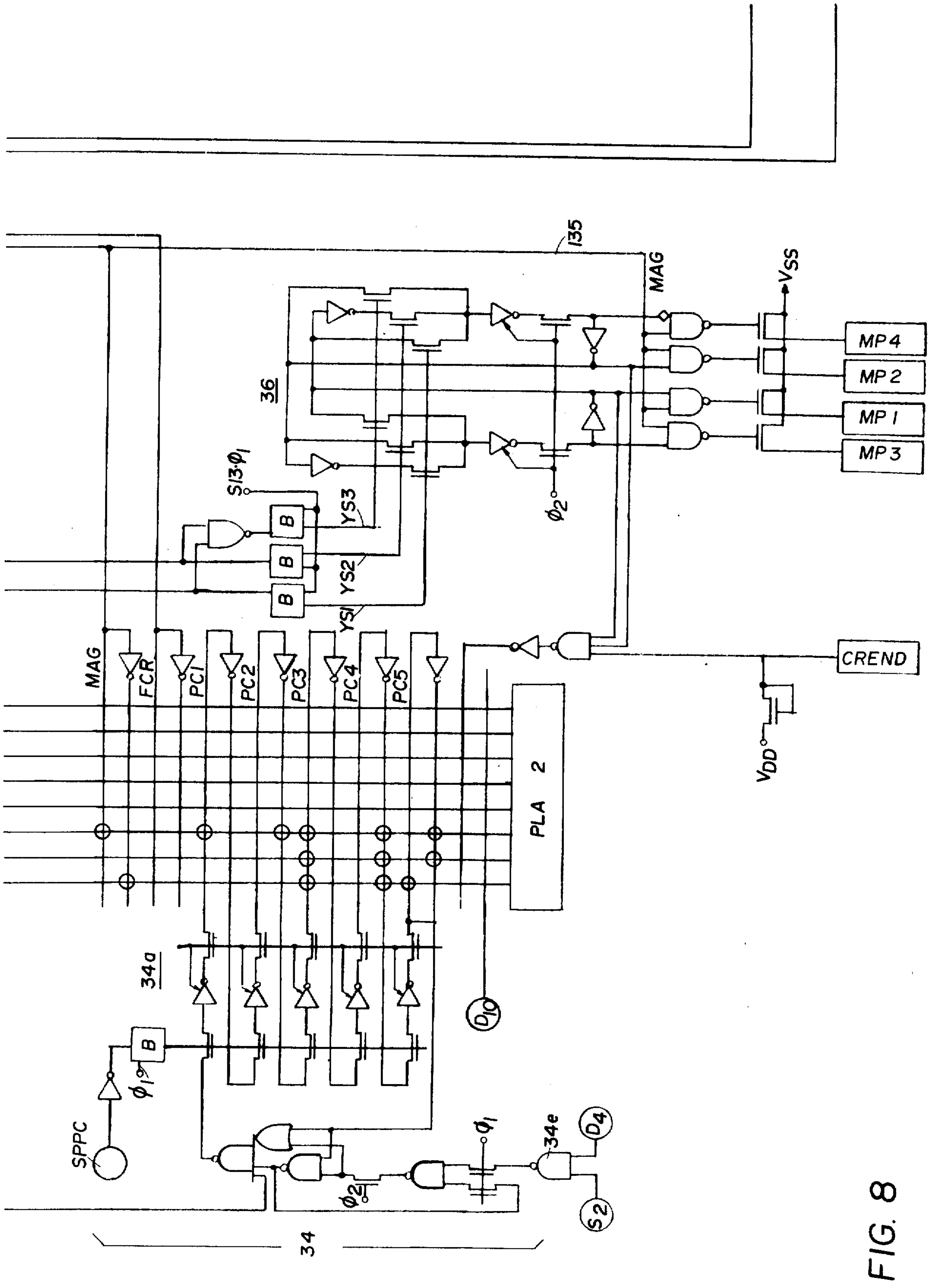

Unit 34 of FIGS. 7 and 8 comprises a five stage recirculating counter 34*a* which leads to a PLA 34*b* having 16 input lines and eight select lines. The select lines are gated by gates 34*c* to a section 34*b* having eight input lines and five select lines. The select lines are identified as ZPC, ZCOOL, MOTEND, STPRS and STPLS. The latter two lines lead by way of channels 34*e* to the motor control unit 36. The counter 34 has operation initiated by two outputs from the printout control unit 39 of FIGS. 10 and 11, namely SFPR (start print) and CR (carriage return). They are applied by way of logic 130 to set a latch 131 which generates a wait state on output line 132 which leads to counter 39*e*. A wait state stops counter 39*a* until the wait state is removed.

Counter 34 of FIG. 8 continuously counts from zero through five in response to S2 and DA (in this case, D1). At the instant that SFPR is generated, the wait condition is generated. Nothing further happens until an output ZCOOL is generated on the upper section 34*d*. When this happens, a latch 133 is set to enable one of the row outputs from the row counter 58.

The ZCOOL line from the counter 34 is programmed in section 34*d* so that its output occurs when the output of the counter section 34*a* is a zero count. Thereafter, the counter 34*a* counts through its five count. The ZPC line is coded so that when the output count reaches five, the ZPC output energizes line SBSF which shifts from one row in counter 58 to another row and also resets latch 133. However, an additional bit is entered into the counter 34*a* each S2 time within each D1 time as controlled by the inputs to the gate 34*e*. Thus, counter 34*a* will repeat a cycle of five counts following which an enabled output from row counter 58 is shifted one stage. After the counter 34*a* has completed five complete cycles of five counts per cycle, all of the output lines from the counter 58 have then been successively enabled to energize the output lines leading to the row lines 59. At the end of the fifth cycle of counter 34*a*, the line EPRT (end print) is enabled. It is switch connected to the fifth stage of the row counter 58. The ERPT signal then is applied by way of inverter 134 to energize the printhead drive motor by way of the mag line 135. The line 135 is connected into the PLA 34*b* to cause counter 34 to change from a five count to a twenty count unit. An interval occupied by twenty counts of counter 34*a* is required for the motor to step the printhead one character position. Thereafter the end of the motor cycle is sensed on line 136 which resets the wait latch 131 and causes the counter 39*e* again to begin counting. This causes the system to select the second digit to be printed from the register 49 and print cycles are repeated until all symbols coded in register 49 and in register 44 have been printed.

Having described the invention in connection with certain specific embodiments thereof, it is to be understood that further modifications may now suggest themselves to those skilled in the art and it is intended to cover such modifications as fall within the scope of the appended claims.

What is claimed is:

1. A semiconductor chip for actuating an A × B matrix of heaters in a thermal printhead in accordance with a digital code stored in a buffer register comprising:

a. a logic array gated to said register and programmed selectively to enable A control lines leading to columns of heaters in said printhead in response to said code,
b. a row counter sequentially to enable B control lines leading to rows of heaters in said printhead,
c. a control logic array programmed to be responsive to a function code to initiate a printing operation,
d. a digit counter operable in response to a condition in said control logic array to immobilize said control logic array and to initiate B successive burn cycles each followed by a cool cycle and followed by incrementing said row counter, and
e. means responsive to a condition in said row counter to enable change in said control logic array.

2. The combination set forth in claim 1 in which said row counter is a B stage counter having an output of each stage connected to an enable circuit for each of said B control lines.

3. The combination set forth in claim 1 in which said digit counter is a ring counter and in which means are provided to increment said ring counter at the end of each said cool cycle.

4. A thermal printer chip for printing a line of symbols in A × B dot matrix form in response to an associated calculator output by control of an A × B heater matrix in a printhead which is movable along said line comprising:

a. a shift register to receive and store coded data representing n characters to be printed,
b. a logic array connected between said register and A columns of said heater matrix programmed to convert said coded data to elements of a dot matrix,
c. control means to circulate said coded data in said shift register one cycle per D time of said printer to cause a different digit code to successively appear at an input gate to said logic array during each said state time,
d. a pointer means to transfer through said input gate a digit code to circuits leading to column control lines of said printhead,
e. a row counter to enable row control lines leading to said printhead, and
f. means to count a predetermined number of D times to turn said row lines on each for a burn time and off for a cool time.

5. The system of claim 4 in which a selected D pulse from said calculator synchronizes the D time generation in said chip and a selected S pulse from said calculator syncs said chip to the state times of said calculator.

6. A thermal printer chip for printing a line of symbols in A × B dot matrix form in response to an associated calculator output by control of an A × B heater matrix in a printhead comprising:

a. a shift register to receive and store coded data representing n characters to be printed,
b. a logic array connected between said register and A columns of said heater matrix programmed to convert said coded data to elements of a dot matrix,
c. control means to circulate said coded data in said shift register one cycle per D time of said printer to cause a different digit code to successively appear at the input to said logic array during each said state time,
d. means responsive to a condition in said calculator to initiate printing of symbols the codes for which successively appear at said array input, and
e. means to selectively enable column and row control lines for control of said heaters.

7. The system of claim 6 in which said condition comprises a selected D pulse from said calculator to synchronize D time generation in said chip and coincidence between a selected flag and S pulse from said calculator.

8. A semiconductor chip for actuating an A × B matrix of heaters in a thermal printhead in accordance with a digital code stored in a buffer register comprising:

a. a logic array gated to said register and programmed selectively to enable A control lines leading to columns of heaters in said printhead in response to said code,
b. a row counter sequentially to enable B control lines leading to rows of heaters in said printhead,
c. a control logic array programmed to be responsive to a function code to initiate a printing operation, and
d. means on said chip selectively and sequentially to enable column and row control lines for control of said heaters in accordance with said code.

9. The method of operating a semiconductor chip for actuating an A × B matrix of heaters in a thermal printhead in accordance with a digital code stored in a buffer register comprising:

gating a logic array to said register selectively to enable A control lines leading to columns of heaters in said printhead in response to said code, sequentially enabling B control lines leading to rows of heaters in said printhead, in response to a function code initiating a printing operation, and selectively and sequentially enabling column and row control lines for control of said heaters in accordance with said code.

10. The method of actuating an A × B matrix of heaters in a thermal printhead through a semiconductor chip in accordance with a digital code stored in a buffer register on said chip comprising:

in response to said code, selectively enabling A control lines on said chip which lead to columns of heaters in said printhead, sequentially enabling B control lines leading to rows of heaters in said printhead, programming a response to a function code to initiate a printing operation, counting on said chip to establish B successive burn cycles each followed by a cool cycle while one of said B control lines is enabled in response to a condition to generated on said chip and in response to a count condition enabling a different one of said B control lines.

* * * * *